United States Patent
Ahmad et al.

(10) Patent No.: US 7,500,064 B2
(45) Date of Patent: *Mar. 3, 2009

(54) DATA COHERENCE SYSTEM

(75) Inventors: Said A. Ahmad, Tucson, AZ (US);
Michael T. Benhase, Tucson, AZ (US);
William D. Williams, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/949,458

(22) Filed: Dec. 3, 2007

(65) Prior Publication Data

US 2008/0082757 A1    Apr. 3, 2008

Related U.S. Application Data

(63) Continuation of application No. 11/040,463, filed on Jan. 21, 2005, now Pat. No. 7,386,676.

(51) Int. Cl.
*G06F 12/00* (2006.01)
*G06F 13/00* (2006.01)
*G06F 13/28* (2006.01)
*G06F 15/177* (2006.01)
*G06F 17/30* (2006.01)

(52) U.S. Cl. ............... 711/141; 711/144; 711/145; 707/201; 707/203; 713/2; 709/222

(58) Field of Classification Search ............ 711/141
See application file for complete search history.

(56) References Cited

U.S. PATENT DOCUMENTS

| 4,195,341 | A   | * | 3/1980  | Joyce et al. ......... 711/118 |
| 6,633,862 | B2  | * | 10/2003 | Thompson ............. 707/1 |
| 2004/0073761 | A1 | * | 4/2004  | Kato et al. ........... 711/165 |
| 2004/0153727 | A1 | * | 8/2004  | Hicken et al. ......... 714/6 |
| 2005/0005071 | A1 | * | 1/2005  | Gammel et al. ....... 711/141 |
| 2005/0138282 | A1 | * | 6/2005  | Garney et al. ........ 711/113 |
| 2005/0153828 | A1 |   | 7/2005  | Uekusa et al. |

OTHER PUBLICATIONS

Yuen, Joe Chun-Hung. Cache Invalidation Scheme for Mobile Computing Systems with Real-time Data. Dec. 2000. SIGMOD Record, vol. 29, No. 4.*

* cited by examiner

*Primary Examiner*—Kevin L Ellis
*Assistant Examiner*—Ryan Bertram
(74) *Attorney, Agent, or Firm*—Quarles & Brady LLP

(57) ABSTRACT

A data coherence system includes a generation number written to a data track of a logical sub-system. The generation number is compared to a corresponding generation number in a processing device when it is initialized. If the two generations numbers are the same, the generation numbers are incremented and saved. If not, cache associated with the logical sub-system residing within the processing device is erased and the generation numbers are reset.

9 Claims, 2 Drawing Sheets

DATA COHERENCE SYSTEM

CROSS-REFERENCE TO RELATED APPLICATIONS

This application is a continuation of U.S. Utility patent application Ser. No. 11/040,463 filed Jan. 21, 2005, now U.S. Pat. No. 7,386,676 the disclosure of which is hereby incorporated by reference as if set forth in its entirety herein.

STATEMENT CONCERNING FEDERALLY SPONSORED RESEARCH OR DEVELOPMENT

None.

BACKGROUND OF THE INVENTION

1. Field of the Invention

This invention is related in general to the field of data storage systems. In particular, the invention consists of verifying that information stored in cache associated with a logical sub-system is not stale after a processing cluster is initiated.

2. Description of the Prior Art

Computer storage systems typically include one or more high-capacity disk arrays for storing digital information. These high-capacity disk arrays are often partitioned into one or more logical sub-system. A computer storage system may utilize multiple data processing servers or may use a single processing server consisting of multiple processing clusters to provide redundancy. Each data processing server or processing cluster ("cluster") may be substantially identical and redundant. Each cluster is primarily associated with a logical sub-system, however, each cluster typically has access to the entire disk array.

It is customary for one or more hosts to send requests to clusters to read data from or write data to the logical sub-systems. The requests are delivered to the clusters over a multi-path communication device such as a bus, switch, router, bridge, point-to-point network, local area network, or other similar connecting device. Once a cluster receives a read-data request, the relevant information is retrieved from the disk array and placed into a read/write memory cache, which is relatively fast compared with other storage mechanisms. Because the cache is typically composed of volatile memory, data stored in this cache will become corrupted if the cluster loses electrical power or is taken off-line for maintenance.

Accessing data from the read/write cache is much faster than retrieving information directly from the disk array. Requested information is passed to the requesting host and a copy is maintained in the read/write cache in case it is again requested by the same or other host. If a host transmits a write request to a processing cluster, either new information is being written to the disk array or information already residing in the disk array is being modified.

In order to protect cached information, a copy of the cached information may be written to non-volatile memory. When a cluster that has been powered down or taken off-line for maintenance is re-initialized, the contents of the non-volatile memory are copied back to the volatile memory of the cache.

In a truly redundant computer storage system, each cluster may access logical sub-systems primarily associated with other clusters. In this manner, if a cluster fails, hosts may still read information from or write information to the associated logical sub-system. Accordingly, a cluster may maintain a cache for its associated logical sub-system and separate caches for each logical sub-system that it has access to. If the cluster loses power or is taken off-line, copies of each cache may be written to the non-volatile memory.

A problem may occur when a cluster is subsequently re-initialized. During the initialization process, the contents of the non-volatile memory are written back to the cluster caches. However, data in the corresponding logical sub-systems may have been modified during the time the cluster was inactive. Since multiple clusters may have cached information from the same logical sub-system, it is desirable to have a system for ensuring that each cache contain data that is coherent with each other corresponding cache and consistent with the information in the logical sub-system.

SUMMARY OF THE INVENTION

The invention disclosed herein utilizes a generation number associated with each logical sub-system. The generation number is saved to a data track within the logical sub-system. A copy of the generation number is saved to a cache-control area within the cluster. Whenever a cluster becomes a dominant processing device for a logical sub-system, the cluster increments the generation number in the data track and saves a copy to the cache-control area associated with the logical sub-system within the cluster. If a cluster has been subsequently powered down or taken off-line, upon initialization, the cluster will compare the generation number for each logical sub-system stored in the cluster's cache-control area with the corresponding generation number residing within each logical sub-system. If a cached generation number does not match the generation number residing within the corresponding logical sub-system, the cluster will re-initialize its cache so as to discard potentially stale data.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of comparing a generation number residing within each logical sub-system with a corresponding generation number saved to an associated cache. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
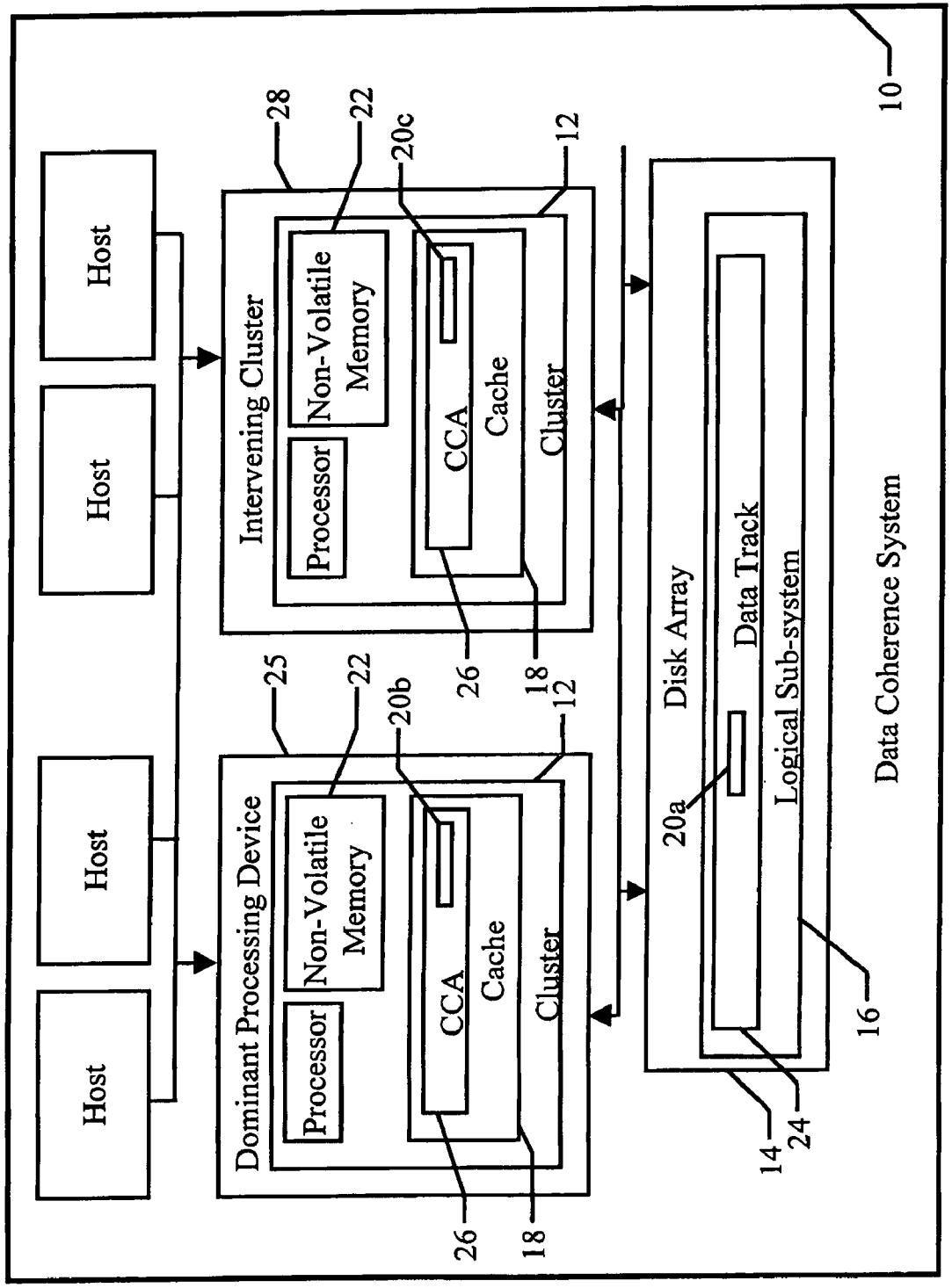
FIG. 1 is a block diagram illustrating a data coherence system including a plurality of processing clusters, a disk array partitioned into a plurality of logical sub-systems, a cache within each cluster associated with each logical sub-system, and a generation number for each logical sub-system stored within each logical sub-system and each cache.

Referring to figures, wherein like parts are designated with the same reference numerals and symbols, FIG. 1 is a block diagram illustrating a data coherence system 10 including a plurality of processing clusters 12, a disk array partitioned 14 into a plurality of logical sub-systems 16, a cache 18 within each cluster 12 associated with each logical sub-system 16, and generation numbers 20a,20b for each logical sub-system 16 stored within each logical sub-system 16 and each cache 18. Each cache 18 is associated with one of the logical sub-systems 16 and temporarily stores data that is either read from or written to the associated logical sub-system 16. In order to maintain the data stored in each cache 18 during a power failure or removal from service, copies of each cache may be stored to non-volatile memory 22.

While each cluster 12 serves as a dominant processing device 25 for one or more of the logical sub-system 16, each logical sub-system 16 may be accessed by other connected clusters 12. In this way, if the dominant processing device 25 is powered down or taken off-line, another cluster may become the associated logical sub-system's dominant processing device. Additionally, each logical sub-system 16 includes a data track 24 that may be accessed by any connected cluster 12. This logical sub-system generation number 20a is stored on this data track 24.

Each cluster 12 maintains a cache 18 for each connected logical sub-system 16. Each cache 18 includes a cache-control area 26 where the cluster generation number 20b is stored. If a cluster 12 is a logical sub-system's dominant processing device 25, then the logical sub-system generation number 20a should match the cluster's corresponding generation number 20b.

However, during a period of inactivity, a cluster's logical sub-systems may have been dominated by an intervening cluster 28. During this period, the intervening cluster 28 may have written information to the logical sub-system 16. If so, the contents of the intervening cluster's cache and the data in the logical sub-system 16 will vary from the data previously stored to the corresponding cache 18 within the dominant processing device 25. Accordingly, the intervening cluster 28 increments the logical sub-system generation number 20a when it dominates the logical sub-system 16 and stores a copy as an intervening generation number 20c in its associated cache-control area 26.

If the dominant processing device 25 becomes active again, it compares its cluster generation number 20b to the logical sub-system generation number 20a. If the generation numbers 20a,20b are different, the dominant processing device discards the contents of the associated cache 18 and resets the generation numbers 20a,20b. If the generation numbers 20a, 20b are the same, both generation numbers are incremented and saved to the data track 24 and cache-control area 26.

The same process is applicable to the intervening cluster 28, should the intervening cluster go off-line. Upon initialization, the intervening cluster 28 will compare its intervening generation number 20c to the logical sub-system generation number 20a. If they are the same, the intervening cluster 28 will retain the data within the associated cache 18, but will not increment the generation numbers 20a,20c. If not, the intervening cluster will discard its stale data and reset its generation number. The logical sub-system generation number 20a will only be saved to the cache-control area 26 of the intervening cluster 28 if the dominant processing device 25 goes inactive, allowing the intervening cluster 28 to dominate the logical sub-system 16.

Figure 2:
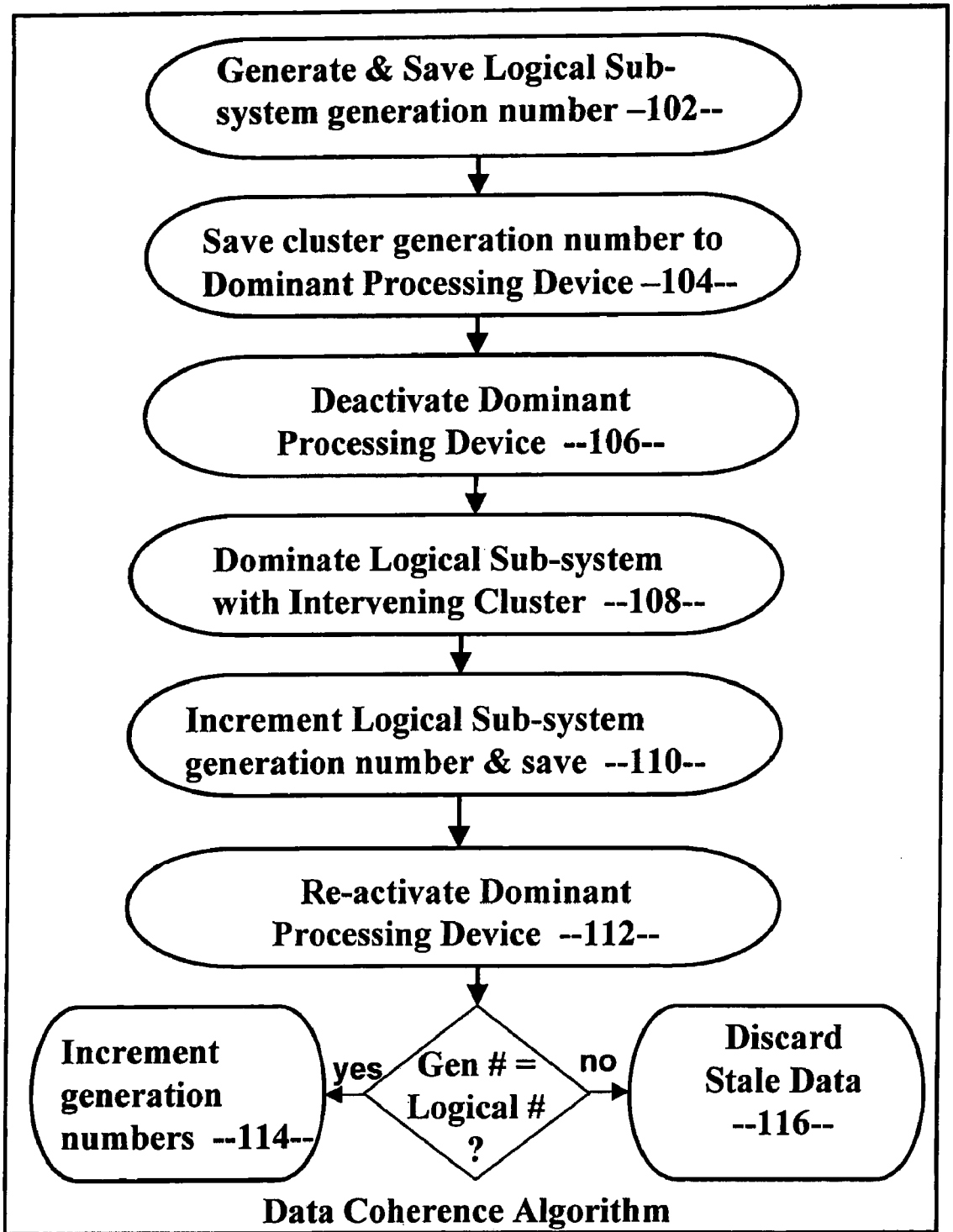
FIG. 2 is a flow chart illustrating the process of maintaining data coherence according to the invention.

FIG. 2 is a flow chart illustrating a data coherence algorithm 100 incorporating a process of maintaining data coherence accordingly to the invention. In step 102, the logical sub-system 16 generates the logical sub-system generation number 20a and saves it to the data track 24. A copy of the generation number is saved as a cluster generation number 20b to the cache-control area 26 of the dominant processing device 25 in step 104. In step 106, the dominant processing device 25 goes offline, either due to a power failure or for maintenance. The intervening cluster 28 dominates the logical sub-system 16 in step 108. The logical sub-system generation number 20a is incremented and a copy is saved as an intervening generation number 20c in step 110. In step 112, the dominant processing device 25 is re-activated. If the cluster generation number 20b is the same as the logical sub-system generation number 20a, both generation numbers 20a,20b are incremented and saved in step 114. If not, the dominant processing device 25 discards its stale data and resets the cluster generation number 20b in step 116.

Those skilled in the art of making deadlock prevention systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A data coherence system, comprising:
   a logical sub-system including a data track, said data track including a logical sub-system generation number; and
   a dominant processing device including a first cache associated with the logical sub-system, said first cache including data and a first cache-control area, said first cache-control area including a cluster generation number;
   wherein the dominant processing device is adapted to compare the logical sub-system generation number to the cluster generation number only during initialization of the dominant processing device and to discard the data and reset the logical sub-system generation number and the cluster generation number if the logical sub-system generation number is not the same as the cluster generation number.

2. The data coherence system of claim 1, wherein the dominant processing device is further adapted to increment the logical sub-system generation number during initialization, to save the logical sub-system generation number to the data track, and to write the logical sub-system generation number to the first cache-control area as the cluster generation number if the logical sub-system generation number is the same as the cluster generation number.

3. The data coherence system of claim 2, further comprising an intervening cluster including a second cache associated with the logical sub-system, said second cache including a second cache-control area, said second cache-control area including an intervening generation number;
   wherein the intervening cluster is adapted to dominate the logical sub-system if the dominant processing device becomes inactive, to increment the logical sub-system generation number, to save the logical sub-system generation number to the data track, and to write the logical sub-system generation number to the second cache-control area as the intervening generation number.

4. The data coherence system of claim 1, wherein the dominant processing device is adapted to change the cluster generation number and logical sub-system generation number only upon initialization of the dominant processing device.

5. The data coherence system of claim 1, wherein the dominant processing device includes a non-volatile memory configured to store data from the first cache, the dominant processing device configured to transfer data stored in the non-volatile memory to the first cache during initialization of the dominant processing device.

6. An article of manufacture including a data storage medium, said data storage medium including a set of machine-readable instructions that are executable by a processing device to implement an algorithm, said algorithm comprising the steps of:
   generating a logical sub-system generation number;
   saving the logical sub-system generation number to a data track within a logical sub-system; and
   initializing a dominant processing device, said initializing step including comparing the logical sub-system generation number to a cluster generation number located within a first cache-control area located within a first cache located within the dominant processing device;
   wherein the logical sub-system generation number and the cluster generation number are compared only during initialization of the dominant processing device.

7. The article of manufacture of claim 6, further comprising the steps of, if the logical sub-system generation number is the same as the cluster generation number:
   incrementing the logical sub-system generation number;
   saving the logical sub-system generation number to the data track;
   copying the logical sub-system generation number to the first cache-control area as the cluster generation number.

8. The article of manufacture of claim 7, further comprising the steps of, if the logical sub-system generation number is not the same as the cluster generation number:
   resetting the logical sub-system generation number;
   deleting data within the first cache; and
   resetting the cluster generation number.

9. The article of manufacture of claim 8, further comprising the steps of:
   taking the dominant processing device off-line;
   dominating the logical sub-system by an intervening cluster including a second cache, said second cache including a second cache-control area, said second cache-control area including an intervening generation number;
   incrementing the logical sub-system generation number;
   saving the logical sub-system generation number to the data track; and
   copying the logical sub-system generation number to the second cache-control area as the intervening generation number.

* * * * *